United States Patent [19]

Boyes et al.

[11] Patent Number: 5,029,674
[45] Date of Patent: Jul. 9, 1991

[54] BRAKING DEVICES

[76] Inventors: Barrie J. Boyes; Paul D. Boyes, both of 181 Stokes Valley Road, Stokes Valley, Lower Hutt, New Zealand

[21] Appl. No.: 385,826

[22] Filed: Jul. 26, 1989

[30] Foreign Application Priority Data

Aug. 1, 1988 [NZ] New Zealand ............... 225630

[51] Int. Cl.⁵ .................................. B60T 1/04
[52] U.S. Cl. ..................... 188/2 F; 188/30; 188/65.1; 188/74; 188/82.2; 280/250.1
[58] Field of Search ............ 188/2 F, 74, 20, 19, 188/24.11, 24.16, 29, 30, 31, 65.1, 65.2, 65.3, 82.2, 82.1, 64; 280/250.1, 304.1; 297/DIG. 4; 74/519, 527

[56] References Cited

U.S. PATENT DOCUMENTS

| | | | |
|---|---|---|---|
| 4,560,033 | 12/1985 | DeWoody et al. | 188/2 F |
| 4,570,756 | 2/1986 | Minnebraker et al. | 188/2 F |
| 4,589,525 | 5/1986 | Phipps et al. | 188/2 F |
| 4,691,933 | 9/1987 | Strauss | 188/2 F X |
| 4,733,755 | 3/1988 | Manning | 188/2 F |
| 4,749,064 | 6/1988 | Jinno et al. | 188/2 F |
| 4,887,830 | 12/1989 | Fought et al. | 188/2 F X |

FOREIGN PATENT DOCUMENTS

| | | | |
|---|---|---|---|
| 0040456 | 11/1981 | European Pat. Off. | 188/2 F |
| 204245 | 5/1983 | New Zealand . | |
| 1243032 | 8/1971 | United Kingdom | 188/2 F |
| 2110780 | 6/1983 | United Kingdom | 188/2 F |

Primary Examiner—Douglas C. Butler
Attorney, Agent, or Firm—Volpe and Koenig

[57] ABSTRACT

A manually operable hand braking device for such as but not necessarily confined to, a wheel (23) of a wheel chair. The device including a mounting member fixed adjacent the wheel periphery (23a), and a body part (5) mounted for partial rotation about an axis (7) of the mounting member (1) (2) extending transversely of the wheel (23); movement of the body part (5) being effected by a hand grip (26) and lever part (24), extending from the body part (5). The body part (5) being provided with two projecting spaced brake lock parts (21,22) disposed adjacent the wheel periphery (23a) or tire thereon, and arranged so that either of the brake lock parts (21 or 22) are engageable with the wheel periphery (23a) or tire on rotational movement of the body part (5), in one direction or the other, there being an intermediate position permitting freedom of rotation of the wheel (23). The arrangement and positioning of the brake lock parts (21,22) providing that engagement of one with the wheel periphery (23a) will prevent wheel movement in one direction and engagement of the other with the wheel periphery will prevent wheel movement in the other direction. There being locking arrangement (29 1) to lock at least one of the brake lock parts (21,22) in engagement with the wheel periphery (23a). The device also has applications for braking or restricting movement of such as the wheel(s) of other apparatus and such as ropes or belts.

17 Claims, 8 Drawing Sheets

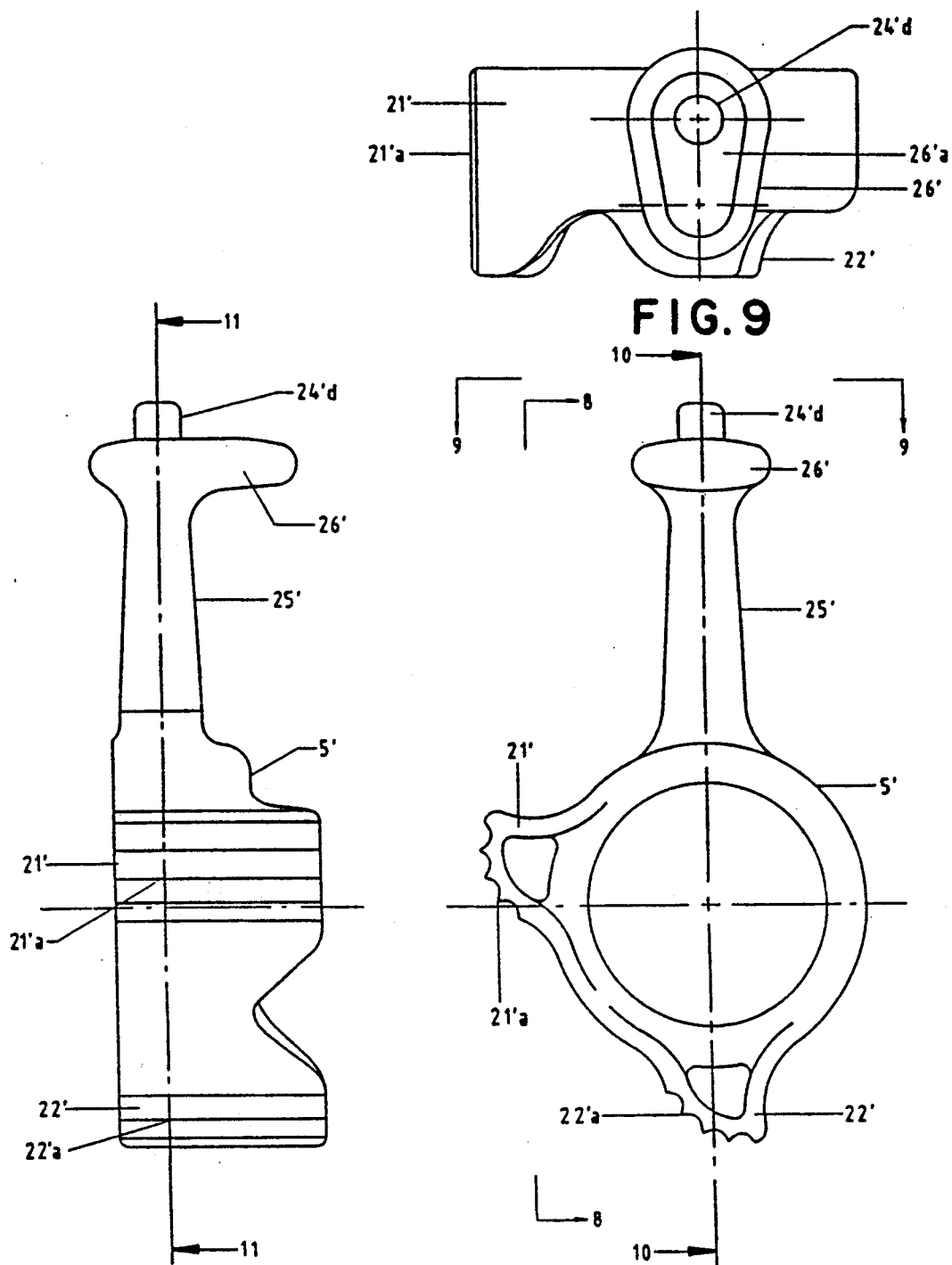

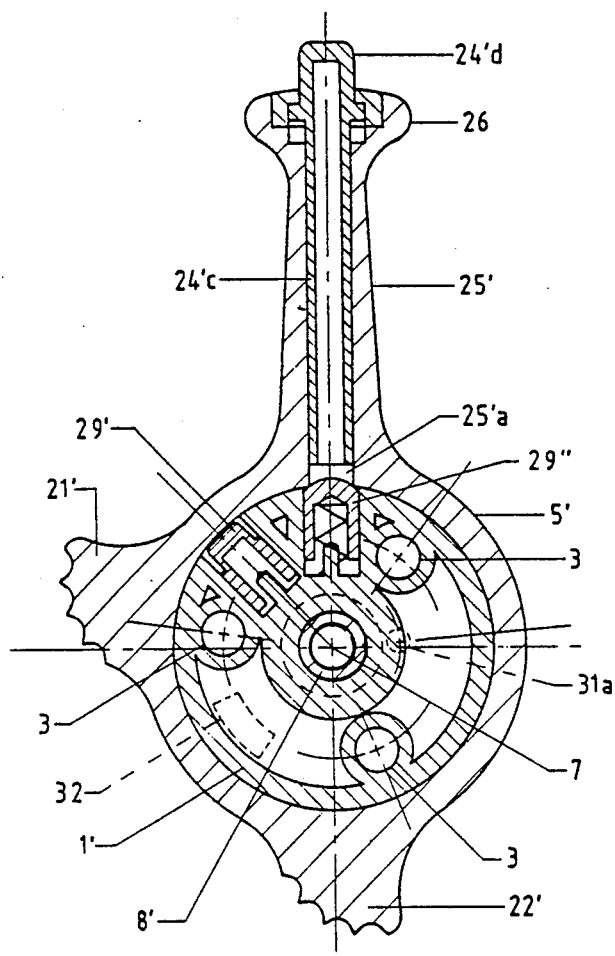
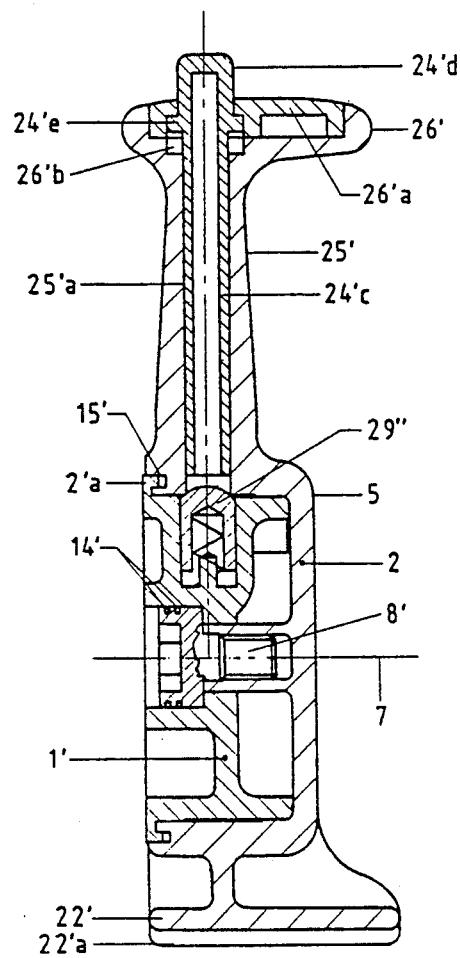
FIGURE 11  FIGURE 10
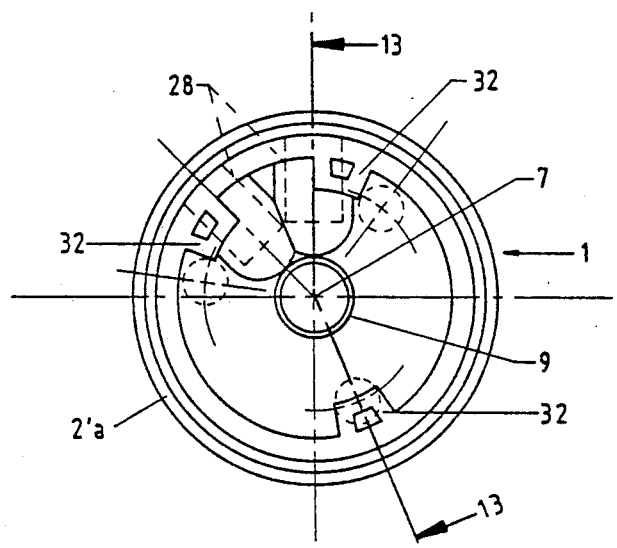
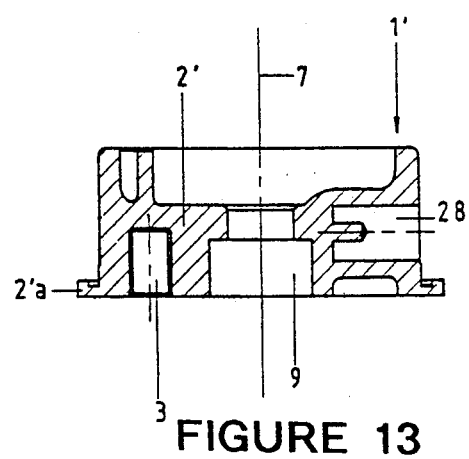
FIGURE 12  FIGURE 13

BRAKING DEVICES

BACKGROUND

This invention relates to braking devices for movable surfaces, and more particularly relates to braking devices of the kind which are arranged to engage on an outer part of a moving surface such as on the periphery of a wheel; although it will be appreciated from the following description that the invention is not necessarily confined to the braking of wheels only, but may be also applicable to the application of a brake to restrict movement of such as a rope or cable or an endless loop belt or other apparatus including a movable surface which requires on occasions to be restricted against movement.

The invention is further particularly applicable to braking devices for use on a wheel having a resilient peripheral tire, such may be found or employed on a wheelchair, peramulator, trolley or the like. Various cam type, cam operated or lever brake devices arranged for pressure engagement with resilient tires on wheels have been devised and employed, some effectively and others not so effectively; and one object of the present invention is to provide an alternative construction of braking device which is simple to operate and is effective and positive in its braking action.

Other and more particular objects and advantages of the invention will become apparent from the ensuing description.

SUMMARY OF INVENTION

According to a first aspect of this invention, there is provided a braking device comprising a mounting member arranged for fixedly mounting in close proximity to a normally freely movable surface, said mounting having an axis arranged for disposition transverse to the normal direction of movement of said surface, a main body part supported by said mounting member for partial rotation of said body part about said mounting axis, hand grip means mounted on said body part for effecting said partial rotation of the body part relative to the mounting member between at least first and second positions, and locking means associated with said hand grip means and mounting member for releasably locking said body part in either of said at least first and second positions; and said body part having at least one external brake lock part projecting therefrom and arranged to engage the movable surface to prevent movement thereof when said body part is moved to said first position, and said brake lock part being movable clear of said movable surface for freedom of movement with the body part in said second position.

Many braking systems and devices employed in the past have been effective in preventing movement of a movable surface, such as on a wheel, in one or either direction, but not so effective in preventing movement of the movable surface in either direction as well as in one direction, particularly when under load. Accordingly, another object of the invention is to provide a braking device having three effective positions;

a first for positive braking against movement of the movable surface in a normal first direction of movement, an intermediate position permitting freedom of movement of the movable surface in either direction, and a third position providing freedom of movement of the movable surface in one direction but positive braking and preventing of movement of the movable surface in the reverse direction.

According to a second aspect of this invention therefor, there is provided a braking device comprising a mounting member arranged for fixedly mounting in close proximity to a normally freely movable surface with an axis of said mounting member arranged for disposition transverse to the normal direction of movement of said surface, a main body part supported by said mounting member for partial rotation of said body part about said mounting axis, hand grip means mounted on said body part for effecting said partial rotation of the body part relative to the mounting member between first, second and third positions, and locking means associated with said hand grip means and said mounting member for releasably locking said body part in any selected one of said first and second positions; and said body part having two external spaced brake lock parts arranged and positioned such that one of said brake lock parts is positively engagable with said movable surface on movement of the body part to and locking in said first position to prevent movement of said movable surface in any direction, movement of said body part to and locking in said second position will position both said brake lock parts clear of said movable surface for freedom of movement, and movement of said body part to said third position will position the other of said brake lock parts adjacent said movable surface in an over-ride position permitting movement of said movable surface in said normal direction but preventing movement of said movable surface in a reverse direction.

DRAWINGS

The invention is particularly applicable to the application of the brake device to a wheel having a resilient tire, and more particularly as a safety brake system on a wheel chair; and some aspects of the invention will now be accordingly described by way of example and with reference to such an application; and also with reference to the accompanying drawings, in which:

FIG. 7 is a side view of a second form of the invention with further modifications FIG. 8 is a view in the direction of arrows 8—8 of FIG. 7

FIG. 9 is a view in the direction of arrows 9—9 of FIG. 7

FIG. 10 is a sectional view of the second form as viewed on line 10—10 of FIG. 7

FIG. 11 is a sectional side view of the second form as viewed in the direction of arrows 11—11 of FIG. 8

FIG. 12 is a face view of the separated mounting member of the second form of the invention FIG. 13 is a sectional view on line J—J of FIG. 12

Figure 14:
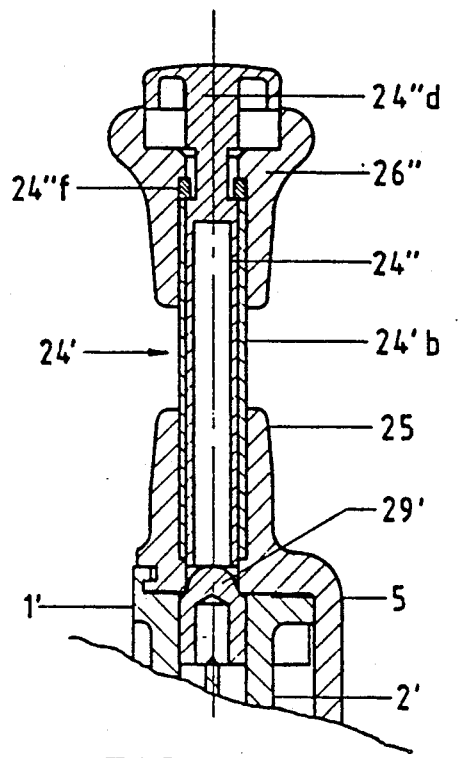
Figure 15:
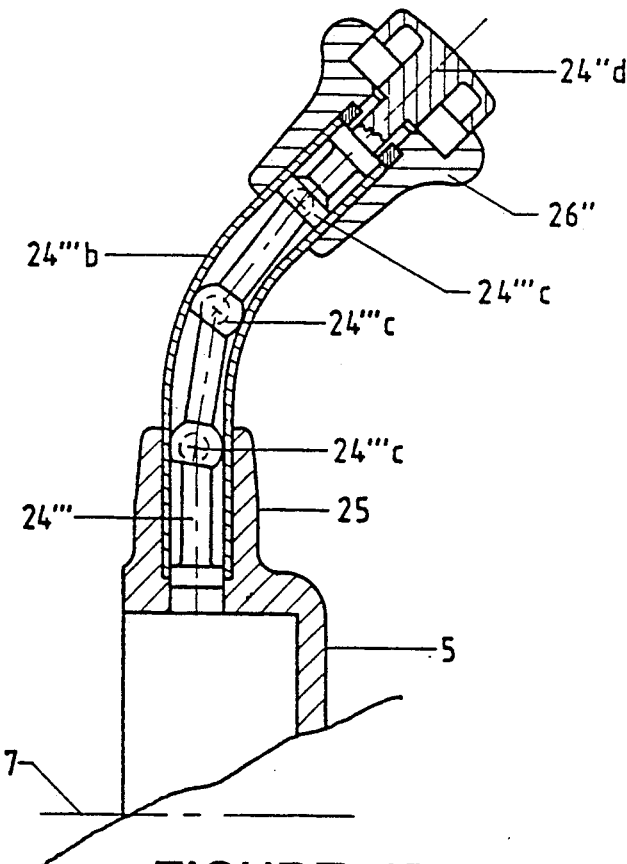
Figure 16:
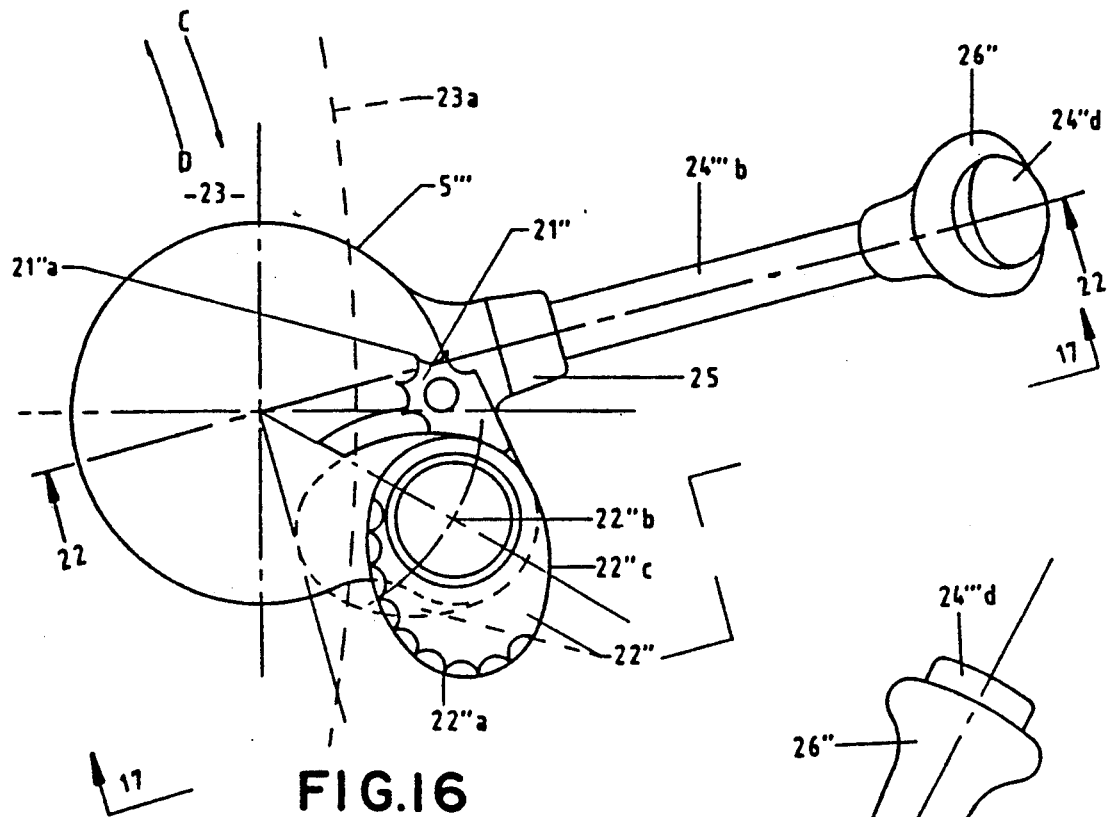
Figure 17:
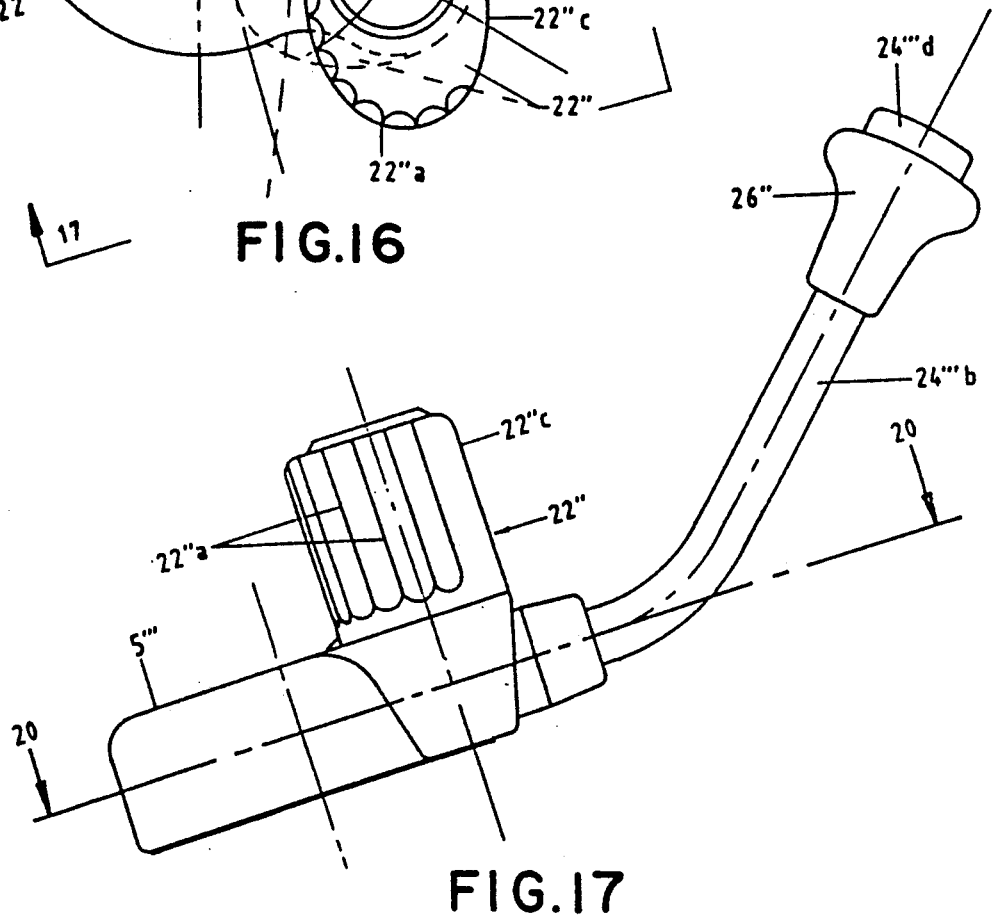

FIG. 14 is a fragmentary sectional view illustrating a variation in hand grip and operating means of the second form of the invention FIG. 15 is a fragmentary sectional view illustrating another variation in the hand grip and operating means of the second form of the invention FIG. 16 is a side view of a third form of the invention, illustrated in the position for wheel braking under load FIG. 17 is a view in the direction of arrows K—K of FIG. 16

Figure 18:
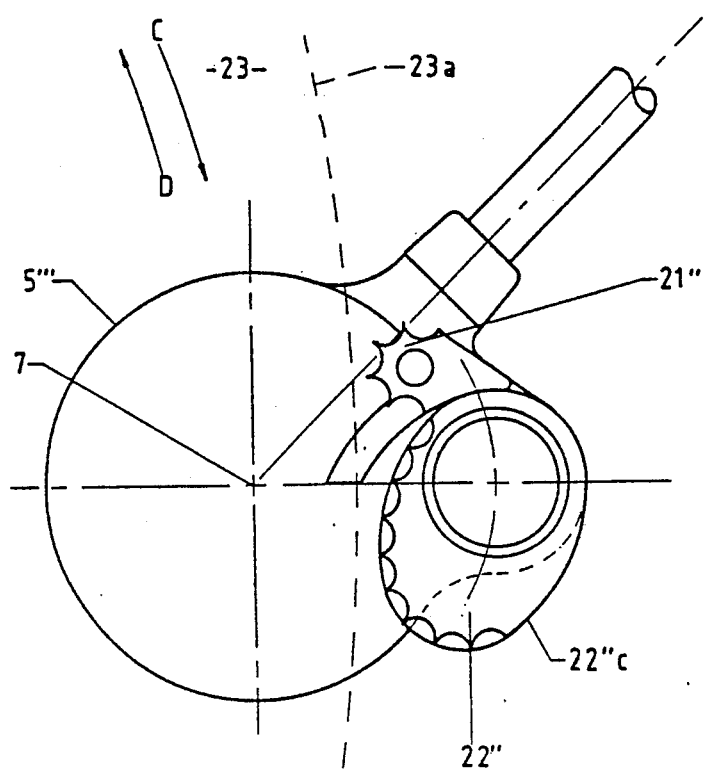
Figure 19:
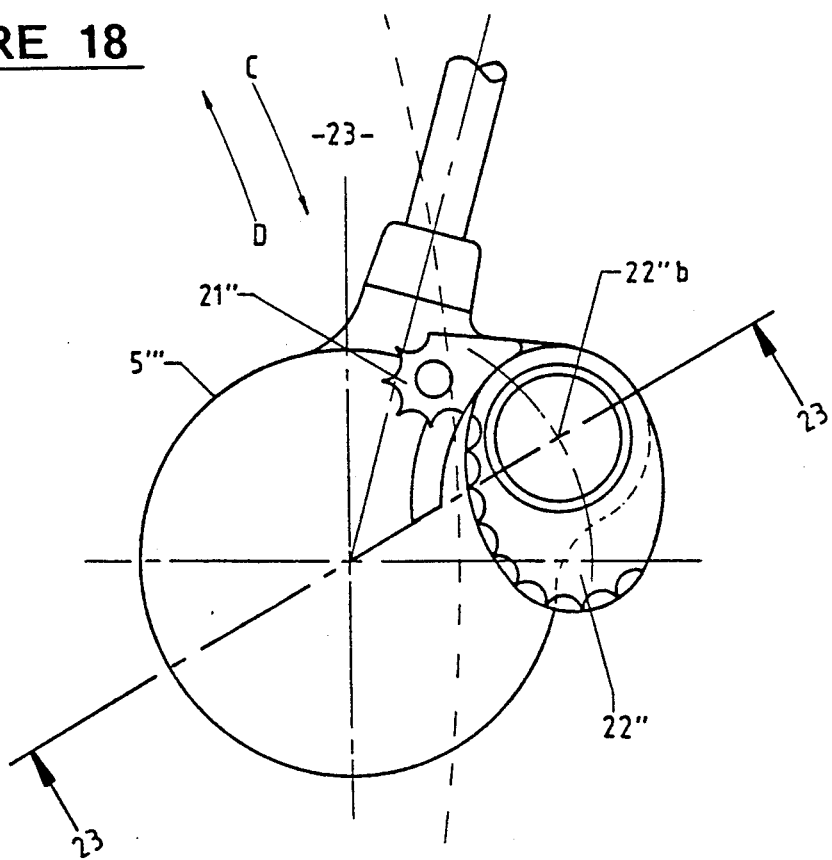
Figures 20, 21:
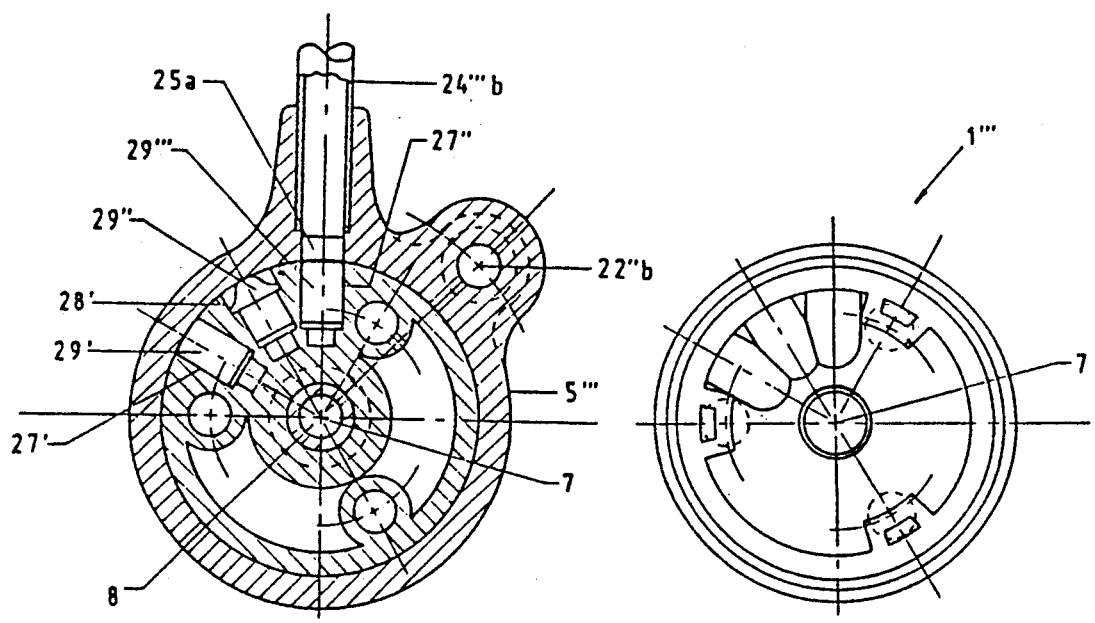

FIG. 18 is a side view of the third form of the invention, illustrated in the normal free-wheeling position FIG. 19 is a side view of the third form of the invention, illustrated in wheel braked position for parking FIG. 20 is a sectional view on line 20—20 of FIG. 17

Figure 22:
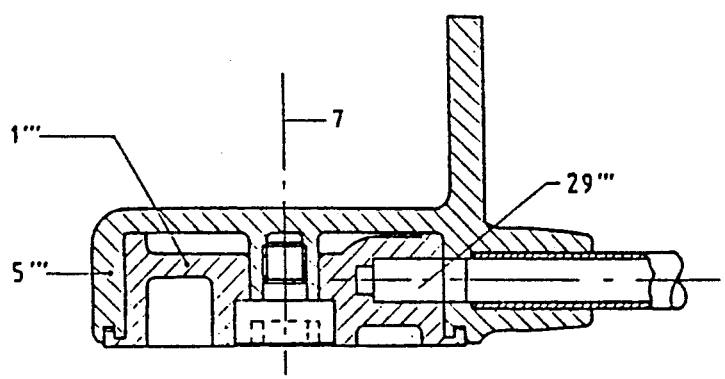
Figure 23:
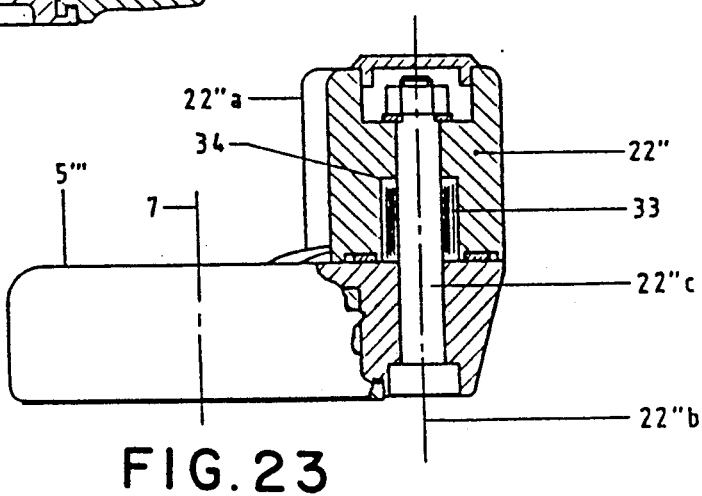

FIG. 21 is a face view of the separated mounting member for the third form of the invention FIG. 22 is a section view on line 22—22 of FIG. 16, and FIG. 23 is part-sectional view on line 23—23 of FIG. 19.

DESCRIPTION OF PREFERRED EMBODIMENTS

Figure 1:
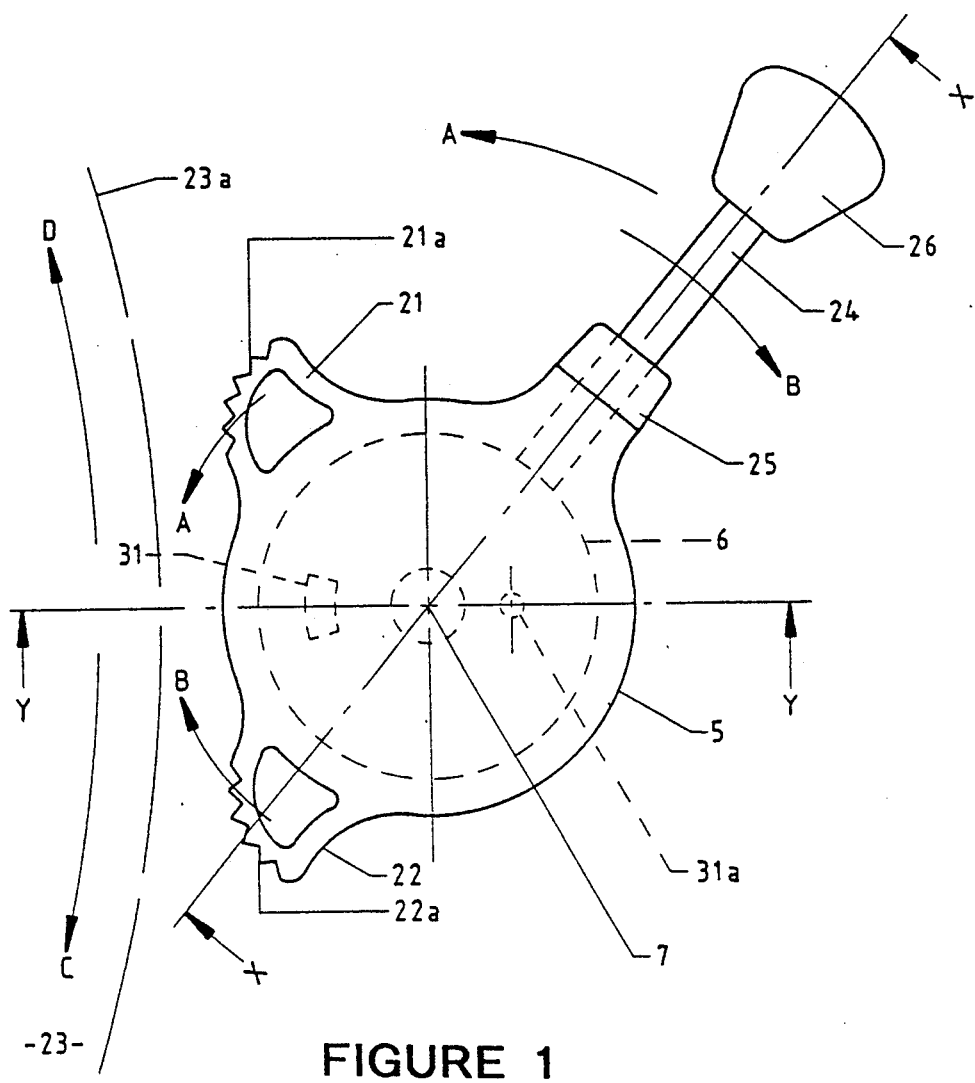
FIG. 1 is a side elevational view of one preferred form of the braking device illustrating its normally mounted relationship with a wheel
Figure 2:
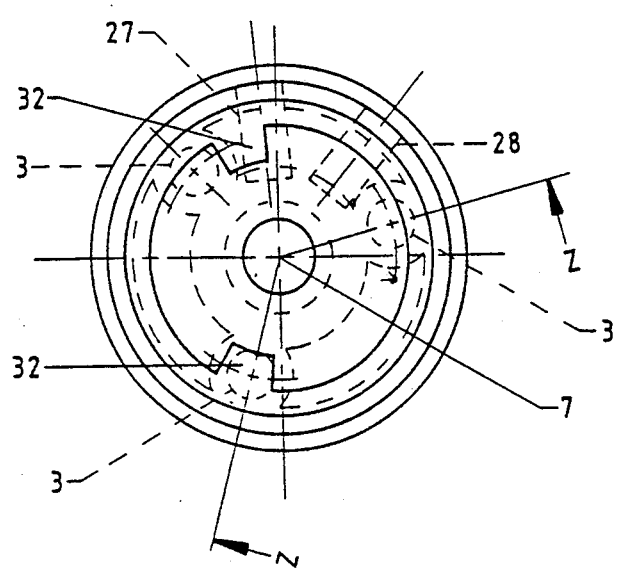
FIG. 2 is an elevational view of the mounting member for the body part of the braking device of FIG. 1
Figure 4:
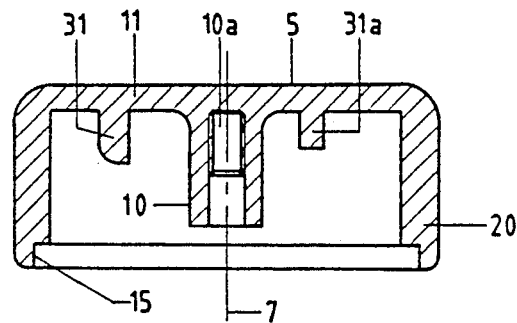
FIG. 4 is a sectional view on line Y—Y of FIG. 1.
Figure 5:
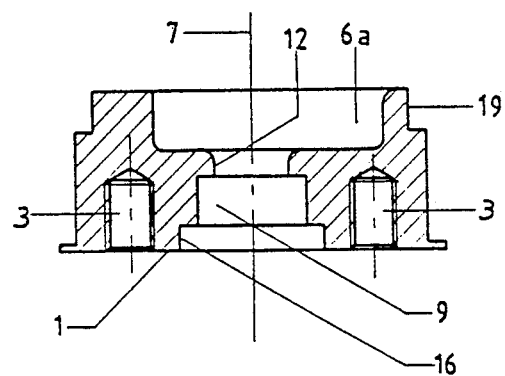
FIG. 5 is a sectional view on lines Z—Z of FIG. 2
Figure 3:
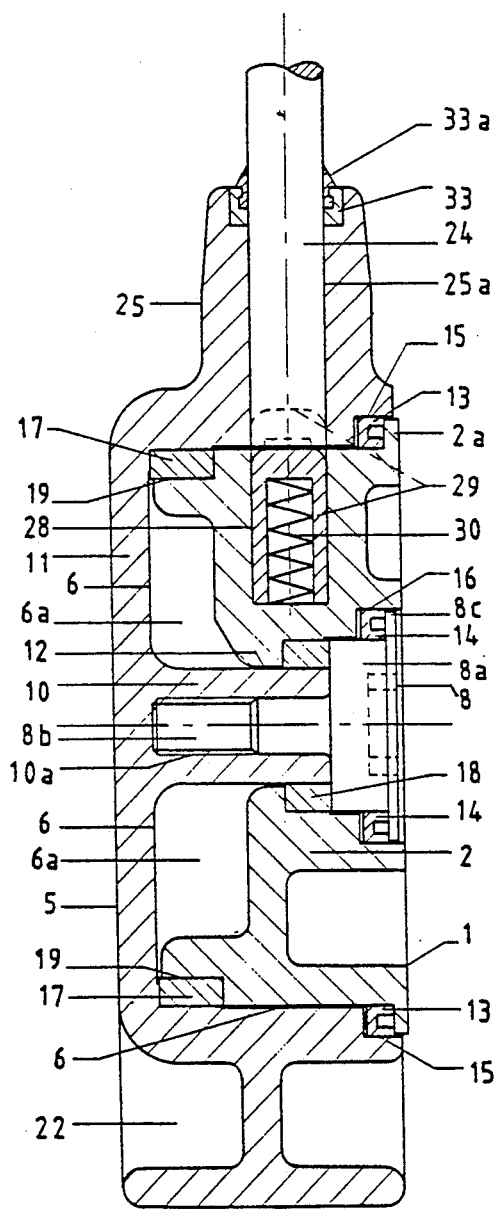
FIG. 3 is a longitudinal sectional view on line X—X of FIG. 1

In a typical wheelchair construction the main support wheels are of large diameter and positioned with their axis of rotation below the seat part of the chair and such that a user can readily grip upper and forward parts of the usually provided annular wheel grip for manual propelling and manoeuvering of the wheel chair. Any manual braking device would thus normally be provided adjacent the upper forward part of one of the wheels (and there would normally be a braking device for each wheel). Thus in the drawings the front part of a wheel 23 is indicated and the arrows C and D respectively indicate the normal forward and reverse directions of rotation. In the first form of the invention according to FIGS. 1 to 5 of the drawings, the mounting, generally indicated by the arrow 1 and shown more particularly in face view and section in FIGS. 2, 3 and 5 is in the form of a circular bearing having a main strong mounting part 2 which is arranged to be fixedly secured against movement on a suitable part of a frame of the wheel chair (not shown) such as by means of a plurality of screw-threaded recesses 3 opening to the rear face and into which mounting bolts (not shown) can be located. The outer periphery of the mounting member 1 is of substantially cylindrical form and the main body part of the device, generally indicated by the arrow 5 and shown particularly in face view in FIG. 1 and in section in FIGS. 3 and 4, is provided with a complementary substantially cylindrical recess 6 whereby the body part 5 is locatable over the mounting member 1 in a slidable rotatable fit, with minimal clearance between the sliding surfaces. The body part 5 is rotatable relative to the mounting member 1 about a concentric axis 7 which may be defined by a retaining bolt or stud member 8 having a circular cylindrical head part 8a located within a co-axial recess 9 of the mounting member 1, and having a threaded shaft 8b arranged for screw-threaded engagement in a co-axial threaded bore 10a of a central co-axial boss part 10 projecting inwardly from an outer face wall 11 of the body part 5, said boss part 9 extending through a co-axial bore 12 of the mounting member 1.

The mounting member 1 and main body part 5 can be manufactured from any suitable materials and can for example be manufactured by any suitable means from metal materials; but in a preferred form of the invention such parts are fabricated at least predominantly from a high density rigid setting plastics material resistant to corrosion and capable of withstanding stress and frequent use, and further having inherent self lubricating qualities facilitating close fitting sliding contact between the respective surfaces of the mounting member 1 and body part 5. As the braking device would be used in connection with wheel chairs subject to outdoor exposure, and as it is essential that the components remain free to operate at all times, and to further guard against internal wear and tear, various seal means can be employed to present dust or grit entering the braking device. Accordingly, annular seal rings 13, 14 can be employed and be locatable within annular outer recesses 15, 16 of the body part 5 and mounting member 1 to engage and seal against outer peripheral annular flange portions 2a and 8c, respectively, of the mounting member 1 and axial retaining stud head. Annular replacement bearings 17, 18 of a suitable self lubricating plastics material can also be provided internally of the braking device such as within an inner peripheral recess 19 of the mounting member 1 and within the first co-axial recess 9 for receiving the retaining stud head 8a, and providing a bearing surface for the outer periphery of the central boss 10 of the body part 5. The outer seal rings 13 and 14 can be resilient, or instead of being resilient can also be of a hard self lubricating plastics material and serve additionally as outer bearing surfaces between the mounting member 1 and body part 5.

The main body part 5 may have its outer portion 20, extending from the face part 11 and surrounding or defining the mounting part receiving recess 6, of substantially annular flange form i.e. circular, for a major part of its periphery; but with a pair of spaced peripheral brake lock parts 21 and 22 which can be substantially in the form of quadrants with transverse tire gripping ribs 21a, 22a on the arcuate outer parts thereof, the ribbed arcuate parts of the quadrant shaped brake lock parts 21 and 22 being directed towards each other and being of similar dimensions and radial positioning equally each side of a mid-neutral line Y—Y passing through the axis of rotation 7. In the drawings the neutral line Y—Y is shown horizontal and the quadrant shaped lock parts 21, 22 are shown positioned at 30° to a vertical line passing through the axis of rotation 7 of the body part 5—260 the positioning of the brake lock parts 21, 22 relative to the wheel tire periphery 23a provides that in the neutral position illustrated both brake lock parts 21 and 22 are clear of such tire periphery 23a to enable free rotation of the wheel 23, and with the body part 5 rotated about its axis 7 relative to the mounting member 1 in the direction of arrows A the upper brake lock part 21 will be brought into engagement with the tire periphery 23a and may be locked in such engaging position as hereinafter described; or with movement of the main body part 5 in the reverse direction of arrows B, the lower second brake lock part 22 can be brought into over-riding engagement with the wheel periphery 23a without locking of the body part 5 in position; to thus permit the wheel 23 to rotate in the normal direction C for forward movement of the wheel chair, but preventing reverse directional movement D—any such reverse directional movement D drawing the second brake lock part 22 fully into engagement with the wheel tire periphery 23a. This being a desirable safety measure when a wheel chair occupier is negotiating such as a hill or slope and is thus able to put the braking device into the third position to allow rotation of the wheel chair wheels in the forward direction to climb the hill, and providing automatic braking on any tendency towards rearward movement downhill.

Operation of the braking device by movement of the main body part 5 and actuation of the locking means is arranged to be provided by means of a lever hand grip member comprising a shaft lever 24 slidably radially located in a radial bore 25a of a sleeve part 25 of the main body part 5 projecting outwardly therefrom away from the brake block parts 21 and 22; the shaft lever 24 having its outer upper end provided with a hand grip knob 26 or the like and its inner end alignable with first and second radial recesses 27 and 28 in the mounting member 1 mounting part 2 opening to the periphery thereof, and each housing similar spring biassed plungers 29 similar in diameter to the diameter of the operating shaft lever 24 so as to be slidably locatable within the inner end of the sleeve part bore 25a when aligned therewith. The plungers 29 may each be hollow members outwardly biassed relative to the respective recesses 27, 28 by means of suitable compression springs 30; and the arrangement and positioning of such radial spring biassed plungers 29 is such that when the main body part 5 is rotated by means of the shaft lever 24 in the direction of arrows A to the first position, the first plunger 29 in recess 27 is released upwardly into the inner lower end of the sleeve bore 25a to lock the body part 5 in this first position; and thus with the first brake lock part 21 in positive engagement with the tire periphery 23a. The plunger 29 in recess 27 slidably moves the shaft lever 24 outwardly in so doing, and may be released from this locking position by pressure on the knob 26 to urge the shaft lever 24, and thus the plunger 29 of recess 27, inwardly until the first plunger 29 disengages from the sleeve bore 25a to permit the shaft lever 24 to be moved rearwardly in the direction of arrows B, moving the first brake lock member 21 out of engagement with the tire periphery 23a. On reaching the second neutral position as shown in full in the drawings, the second plunger 29 in recess 28 can be similarly permitted to slide into engagement with the inner end of the sleeve bore 25a and lock the main body part 5 and thus braking system as a whole in the neutral position allowing freedom of movement in either direction of the wheel 23 and wheel chair supported thereby. When restricted braking is required for negotiating a hill or slope, the shaft lever 24 is depressed to move the second plunger 29 fully back home into its respective recess 28 against the spring bias to allow further movement of the shaft lever 24 in the direction of arrows B to enable the second brake lock member 29 to be brought into overriding engagement with the wheel periphery 23a. The direction of the arcuate ribbed portion of such brake lock member 22 then permitting forward movement of the wheel chair by the second brake lock member overriding the tire periphery 23a in the main direction C, but any tendency of the wheel to rotate in the reverse direction will cause the second brake lock member 22 to be drawn into full engagement with the tire periphery 23a in preventing such reverse direction movement. Preferably, the braking device includes spring bias means e.g. such as a helical clock spring (not shown) located within an inner annular recess part 6a defined by the mounting member 1 and having one end secured relative to the mounting member 1 and the opposite end secured relative to the main body part 5, e.g. on an inwardly directed anchor peg 31a to normally bias the rotational movement of the body part 5 in the direction of arrows B; so that full braking by movement in the direction of arrows A is against the spring bias, and the braking device is biassed firstly towards the neutral position and secondly towards the restrictive reverse braking position.

The body part 5 can be provided with a first stop member 31 projecting inwardly from its face wall part 11 which is located between two spaced limiting stop members 32 projecting inwardly of the recess 6a of the mounting part 1 to limit the extent of rotational movement of said body part 5 relative to the mounting part 1—one of said limit stop members 32 may also serve as an anchor or abutment for one end of the biassing spring biassing rotation movement of the body part in the direction of arrows B.

Figure 6:
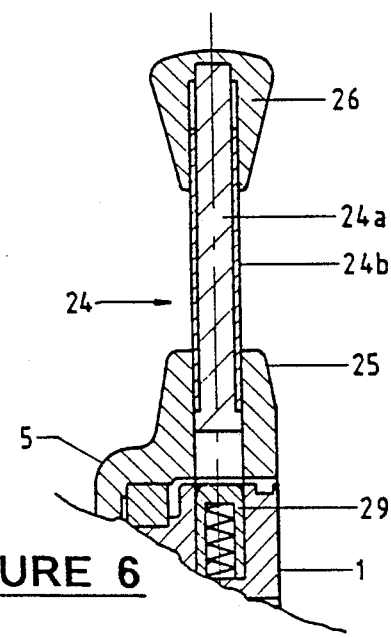
FIG. 6 is a fragmentary sectional view illustrating one modification of the hand grip and operating means of the first form of the invention

The outer portion of the sleeve part 25 can be provided with a recess for the receipt of an annular bearing and sealing ring or sleeve 33 of a suitable self lubricating plastics material, through which the lever shaft 24 is slidably engaged; and for further sealing against the entry of dust, a resilient outer collar 33a engaged with the outer bearing ring can locate about the shaft lever 24. In one modification of the first described and illustrated form of the invention, and with reference now to FIG. 6 of the drawings, the shaft lever 24 can be a two part construction with an inner cylindrical shaft 24a slidably located within a supporting strong metal cylindrical tube sleeve 24b which is fixedly secured to and extends from the body sleeve part 25. The inner end of the shaft 24a is located within the bore 25a and arranged to contact and depress a locking plunger 29 located therein, as before; and the outer end part of the shaft 24a has the hand grip knob 26 secured thereto with the lower or inner part of such knob 26 slidably located over the outer end part of the tube sleeve 24b to enable depression relative thereto.

Referring now to FIGS. 7 to 13 of the drawings, in a second form of the invention, the basic concepts as described with reference to FIGS. 1 to 6 are incorporated (like parts being similarly referenced), but further modifications or variations are illustrated by way of example.

Firstly, the two brake lock parts 21', 22' are integrally formed on the body part 5' and are of similar quadrant form in side elevation with the transverse tire gripping ribs 21'a, 22'a; but are of extended transverse width to provide a greater tire grip area, as may be required with a heavier wheel chair user and wheel chair with wider than usual tires. Secondly the construction of mounting member 1' and body part 5', employing strong rigid plastics material(s), dispenses with the annular seals 14, 17 and 18 provided for in the first construction of FIGS. 1 to 5; and provides for O-ring seals 4', only on the retaining and pivot bolt 8',and sealing against dust and grit entry by way of an annular concentric groove 15' in the body part 5' shaped to slidably receive an inturned annular concentric flange or rib 2'a of the mounting member 1'. Further variations include extension of the integrally formed body sleeve part 25' to merge into and define a combined lever and hand grip, the upper end or knob part 26' of which can protrude laterally or transversely to provide a more comfortable and readily gripped handle; the bore 25'a extending fully therethrough and slidably housing a plunger release shaft 24'c (which may be tubular, and of steel as reinforcement) with an integral or fixed depressable button 24'd at its outer end and protruding beyond the knob part 26' for depression as required (such as by the users thumb or palm) for depression and disengagement of a plunger 29 from the bore 25a inner end. The shaft 24'c can be retained against accidental disengagement from the sleeve 25' by means of an inset flange or collar 24'e on the button 24'd and a retaining cap or insert 26'a of the knob part 26'; the cap/insert 26'a and/or knob part 26' being provided with a recess 26'b to accommodate movement of the flange or collar 24'e with the shaft 24'.

A further modification illustrated in the second form of the invention is the flat end shaping of the outer end of one plunger 29' to maintain positive locking (e.g. for parking the wheelchair) within the body part bore 25'a until fully depressed clear of the bore 25'a; and the rounded or domed shaping of the outer end of the other plunger 29" so that it does not fully locate within the inner end of the bore 25'a but provides for partial locking capable of being over over-ridden to disengage from the bore 25'a inner end with sudden lever pressure or force on the combined hand grip lever 25', 26 without having to depress the button 24'd and shaft 24'c, as may be required for emergency braking of the wheelchair. FIG. 14 of the drawings illustrates another modification of the first and second described and illustrated forms of the invention, with the integral body sleeve part 25 retained relatively short and the lever arm and handgrip partly similar to that shown in FIG. 6 with a strong tubular metal sleeve 24'b slidably housing a plunger release shaft 24" (illustrated as being tubular) with an integral or fixed press button 24"d at its upper or outer end protruding beyond and slidably located with a handgrip knob 26" secured to the upper outer end of the sleeve 24'b. In this arrangement the release shaft 24" can be retained against accidental disengagement from the sleeve 24'b and knob 26" such as by a retaining circlip 24"f.

In some wheelchair constructions, the location of the braking device may require that the brake lever arm be cranked or bent outwardly for convenience of operation by a user and to avoid the need for any additional linkage mechanism (which could be prone to failure or detract from desired positive and fast action). Accordingly, it is envisaged that a short strong sleeve type lever arm can be provided in the necessary or desired cranked or bent form, and a flexible or link construction inner plunger release shaft located therein. One example of this modification or variation of the invention is shown in FIG. 15 of the drawings and involves a fixed arcuate tubular sleeve 24'''b extending from the body sleeve part 25 and slidably housing a plunger release shaft 24''' made up of a series (the number being dependent upon the length and curvature of the sleeve 24'''b) of short parts conjoined by ball or "knuckle" joints 24'''c. The knob 26" and press button 24"d parts being as for the arrangement described with reference to FIG. 14 of the drawings.

Furthermore variations of the invention are envisaged and will now be described by way of example with reference to the remaining FIGS. 16 to 23 of the accompanying drawings. In this construction a straight or curved lever arm can be employed but a curved lever arm assembly with plunger release shaft 24''', knob 26" and press button 24"d part the same as or similar to those described with reference to FIG. 15 are illustrated. The rotational mounting arrangement of the body part 5''' and mounting member 1''' is generally similar to the second form arrangement described with reference to FIGS. 7 to 13; but in this third form of the invention the mounting member 1''' has three circumferentially spaced recesses 27', 28', 27" slidably housing three spring biassed locking plungers 29', 29", 29''' (two 29' and 29''') of which may be of similar fully locking flat outer end shape and one 29" of which has a rounded or domed outer end shape for partial locking and capable of being over-ridden for emergency braking as described with reference to FIG. 10 and 11 in particular—the partial locking plunger 29" is located intermediate the two other fully locking plungers 29' and 29''', so that the device can be locked fully with either of the brake lock parts in their tire engaging positions and partially locked with both brake lock parts clear of their tire engaging positions.

The third construction also provides for the location of the device to one side, i.e. the inner side, of a wheel 23 and the lateral projection of the tire engaging brake lock parts transversely over the tire or wheel periphery 23a, as may be necessary for some wheel chair constructions—and thus a cranked or outwardly projecting operating lever arm arrangement would be appropriate for convenient operation by a user. Whilst both the laterally projecting brake lock parts can be fixed relative to the device body part 5''' for movement therewith and into positive locking engagement with the wheel periphery 23a; the third form of the invention further provides that one brake locking part 21" is fixed relative to the body part 5''' e.g. integrally formed therewith, and arranged to provide for braking or locking of the wheel against rotation in either direction such as may be required for parking of the wheel chair, whilst the other brake locking part 22" can be separately formed and pivotally mounted on the body part 5''' for movement relative to the body part 5''' as well as movement with said body part 5''' relative to the mounting member 1''' and wheel 23, to provide for self-locking engagement with the wheel periphery 23a when the wheel 23 rotates in one direction and release (on release of plunger 29''') from the wheel periphery when the wheel is rotated in the opposite direction. In particular the arrangement provides for full wheel braking against reverse rotation and free wheel rotational movement in a forward direction, thus facilitating the safe negotiation of an incline by the wheel chair user.

As illustrated in FIGS. 16 to 23 the first fixed brake lock member 21" can be relatively small and provide for tire engagement and wheel braking against movement in either direction under any load conditions and when the device is positioned with plunger 29' engaged in the bore part bore 25a; whereas the second pivoted brake lock member 22" is much larger and is cam shaped (oval) with an eccentric pivot axis 22"b (defined by a mounting and pivot bolt 22"c) and normally retained in the non-engaging position shown in full line in the drawing (such as by a biassing coil spring 33 located with a recess 34 of the cam brake lock part 2") but arranged so as to automatically pivot into full locking or braking engagement with the tire or wheel periphery 23a (as shown in broken outline in FIG. 16) on reverse rotation of the wheel 23 in the direction of arrow D on positioning of the device with the plunger 29''' engaged in the body part bore 25a. In this latter position, forward rotation of the wheel 23 in the direction of arrow C will normally free the cam brake lock part 22" from its engagement with the wheel tire or periphery 23a. Both brake locking parts 21" and 22" are again provided with engaging transverse ribs 21"a and 22"a, but the outer side face 22"c (remote from the tire) of part 22" can be smooth.

The pivoted cam brake lock arrangement is described with reference to FIGS. 16 to 23 and laterally projecting brake lock parts; and it will be appreciated that the same basic concept can also be applied, with appropriate modification and mounting, to a brake device arrangement aligned with the wheel instead of being located to one side of the wheel periphery.

Also, it will be appreciated various of the arrangements and modifications described and illustrated for one form of the invention may be similarly applicable (with modification or adaption as necessary) to the other forms of the invention described and illustrated by way of example. Thus, by this invention, there is provided a relatively simply constructed but safe, effective and strong braking device providing for a locked neutral position, a locked fully brake on position, and a safety restrictive reverse rotation brake position. The braking device may be simply and readily fixed to existing or new wheel chairs in the preferred form of the invention, but as previously indicated the braking device may be similarly applicable to and attached to other wheeled constructions such as a peramulator or other wheeled trolley or like vehicle; and it will be further seen that the invention may also be applicable to such as any other wheel device or to a moving surface such as the surface of an endless loop belt, or to such as a rope or cable—in the latter case, it is envisaged that the invention can have particular application in such as yachting and for the controlled but fast and effective braking releasing and hawling in of rigging or other ropes, lines, cables or the like. Whilst the braking device is particularly effective with resilient surfaces, such as wheel tire surfaces it will be also effective for non-resilient surfaces with, if necessary, friction resistant gripping pads on the brake locking parts.

Some preferred aspects of the invention have been described and illustrated by way of example, but it will be appreciated that other variations of and modifications to the invention can take place without departing from the scope of the appended claims.

We claim:

1. A manually operable braking device for a wheeled conveyance comprising a mounting member arranged for fixedly mounting in close proximity to the periphery of a main support wheel of the conveyance, said mounting member having at least a part thereof in the form of an at least partly cylindrical bearing which is located as a slidable rotatable fit within a complementary substantially cylindrical recess of a main body part to support said body part for partial rotation about and relative to an axis of the fixed mounting member which is arranged for disposition transverse to the normal direction of movement of said wheel periphery, hand grip means mounted on said body part for effecting said partial rotation of the body part relative to the mounting member between at least first and second positions, and locking means associated with said hand grip means and mounting member for releasably locking said body part in either of said at least first and second positions; and said body part having at least one external brake lock part projecting therefrom and arranged to engage the wheel periphery to prevent movement thereof when said body part is moved to said first position, and said brake lock part being movable clear of said wheel periphery for freedom of movement with the body part in said second position.

2. A manually operable braking device for a wheeled conveyance comprising a mounting member arranged for fixedly mounting in close proximity to the periphery of a main support wheel of the conveyance, having at least a part thereof in the form of an at least partly cylindrical bearing which is located as a slidable rotatable fit within a complementary substantially cylindrical recess of a main body part to support said body part for partial rotation about and relative to an axis of said mounting member which is arranged for disposition transverse to the normal direction of movement of said wheel periphery, hand grip means mounted on said body part for effecting said partial rotation of the body part relative to the mounting member between first, second and third positions, and locking means associated with said hand grip means and said mounting member for releasably locking said body part in any selected one of said first and second positions; and said body part having two external spaced brake lock parts arranged and positioned such that one of said brake lock parts is positively engagable with said wheel periphery on movement of the body part to and locking in said first position to prevent movement f said body part to and locking in said second position will position both said brake lock parts clear of said wheel periphery for freedom of movement, and movement of said body part to said third position will position the other of said brake lock parts adjacent said wheel periphery in an override position permitting movement of said support wheel in said normal direction but preventing movement of said movable surface in a reverse direction.

3. A braking device as claimed in claim 1 or claim 2 wherein said spaced brake lock parts are provided on the periphery of the body part for partial rotation therewith about said mounting axis and for movement of either brake lock part into and out of engagement with said wheel periphery.

4. A braking device as claimed in claim 3, wherein said brake lock parts are fixed in relation to the body part and formed integrally therewith to project substantially radially from the said body part periphery, said brake lock parts having transversely ribbed arcuate gripping surfaces engagable with said wheel periphery.

5. A braking device as claimed in claim 1, wherein said locking means comprise the provision in said mounting member bearing part of two circumferentially spaced peripheral recessed each housing a spring biassed plunger and either of which are alignable with an inner end of a bore of said body part to engage therein and restrict rotational movement of the body part relative to the mounting member, and hold said body part with the brake lock parts in selected positions and relationship with said wheel periphery.

6. A braking device as claimed in clam 5, wherein said mounting member bearing part has a third circumferentially spaced peripheral recess housing a spring biassed plunger which can be aligned with said bore inner end to restrict rotational movement of the body part relative to the mounting member, and hold said body part with the brake lock parts in a further selected position and relationship with said wheel periphery.

7. A braking device a claimed in claim 5, wherein one of said plunger members, which is arranged to hold the body part with the brake lock parts in nonengaging relationship with the wheel periphery, has its outer end part shaped to permit over-riding disengagement from the body part bore inner end when engaged therewith and on the application of force to said hand grip means for rotational movement of the body part, for rapid engagement of either of said brake lock parts with said wheel periphery.

8. A braking device as claimed in claim 5, wherein said body part bore slidably houses a release shaft connected to said handgrip means and depressable by a user of the device to move the one of said plungers engaged in the bore inner end inwardly of its recess against said spring bias to permit disengagement of said one plunger from the bore inner end, and rotational movement of the body part to a next selected position with the brake lock parts in their desired relationship with said wheel periphery.

9. A braking device as claimed in clam 5, wherein said hand grip means comprises a lever arm with a fixed shaped hand grip part at its outer end, the opposite end part of said lever arm being slidably mounted within said body part bore and being arranged on depression of an inwardly directed force on the hand grip part and lever arm to engage and depress the plunger end engaged with said bore to effect disengagement therefrom and allow rotational movement of the body part by said lever arm to a next selected position.

10. A wheel chair braking device comprising a mounting member arranged for fixedly mounting in close proximity to the periphery of a main support wheel of the wheel chair, said mounting member having at least a part thereof in the form of an at least partly cylindrical bearing which is located as a slidable rotatable fit within a complementary substantially cylindrical recess of a main body part to support said body part for partial rotation about and relative to an axis of the fixed mounting member which is arranged for disposition transverse to the normal directions of movement of said wheel periphery, hand grip means mounted on said body part for effecting said partial rotation of the body part relative to the mounting member between at least first and second positions, and locking means associated with said hand grip means and mounting member for releasably locking said body part in either of said at least first and second positions; and said body part having at least one external brake lock part projecting therefrom and arranged to engage the wheel periphery to prevent movement thereof when said body part is moved to said first position, and said brake lock part being movable clear of said wheel periphery for freedom of movement with the body part in said second position.

11. A wheel chair braking device comprising a mounting member arranged for fixedly mounting in close proximity to the periphery of a main support wheel of the wheel chair, said mounting member having at least a part thereof in the form of an at least partly cylindrical bearing which is located as a slidable rotatable fit within a complementary substantially cylindrical recess of a main body part to support said body part for partial rotation about and relative to an axis of said mounting member which is disposed transverse to the normal directions of movement of said wheel periphery, hand grip means mounted on said body part for effecting said partial rotation of the body part relative to the mounting member between first, second and third position, and locking means associated with said hand grip means and said mounting member for releasably locking said body part in any selected one of said first and second positions; and said body part having two external spaced brake lock parts arranged and positioned such that one of said brake lock parts is positively engagable with said wheel periphery on movement of the body part to and locking in said first position to prevent movement of said support wheel in any direction, movement of said body part to and locking in said second position will position both said brake lock parts clear of said wheel periphery for freedom of movement, and movement of said body part to said third position will position the other of said brake lock parts adjacent said wheel periphery in an override position permitting movement of said support wheel in said normal direction but preventing movement of said support wheel in a reverse direction.

12. A braking device comprising a mounting member arranged for fixedly mounting in close proximity to a normally freely movable surface, said mounting having at least a part thereof in the form of an at least partly cylindrical bearing which is located as a slidable rotatable fit within a complementary substantially cylindrical recess of a main body part to support said body part for partial rotation about and relative an axis of the fixed mounting member which is arranged for disposition transverse to normal direction of movement of said surface, hand grip means mounted on said body part for effecting said partial rotation of the body part relative to the mounting member between at least first and second positions, and locking means associated with said hand grip means and mounting member for releasably locking said body part in either of said at least first and second positions; and said body part having at least one external brake lock part projecting therefrom and arranged to engage the movable surface to prevent movement thereof when said body part is moved to said first position, and said brake lock part being movable clear of said movable surface for freedom of movement with the body part in said second position.

13. A braking device comprising a mounting member arranged for fixedly mounting in close proximity to a normally freely movable surface, said mounting member having at least a part thereof in the form of an at least partly cylindrical bearing complementary substantially cylindrical recess of a main body part to support said body part for partial rotation about and relative to an axis of the fixed mounting member which is arranged for disposition transverse to the normal direction of movement of said surface, hand grip means mounted on said body part for effecting said partial rotation of the body part relative to the mounting member between first, second and third positions, and locking means associated with said hand grip means and said mounting member for releasably locking said body part in any selected one of said first and second positions; and said body part having two external spaced brake lock parts arranged and positioned such that one of said brake lock parts is positively engagable with said movable surface on movement of the body part to and locking in said first position to prevent movement of said movable surface in any direction, movement of said body part to and locking in said second position will position both said brake lock parts clear of said movable surface for freedom of movement, and movement of said body part to said third position will position the other of said brake lock parts adjacent said movable surface in an override position permitting movement of said movable surface in said normal direction but preventing movement of said movable surface in a reverse direction.

14. A braking device as claimed in claim 3, wherein said mounting member and body part are arranged for location to one side of said support wheel and said brake lock parts project laterally from said body part in an offset relationship to the mounting member axis and so as to extend laterally over said wheel periphery.

15. A braking device as claimed in claim 14 wherein one of said brake lock parts is fixed relative to said body part and is arranged on movement with the body into engagement with said wheel periphery to prevent movement in either direction of said support wheel; and the other of sid brake lock parts is mounted for pivotal movement about an axis parallel with said mounting member axis between an engaging position engaging said wheel periphery to prevent movement in one direction and a disengaged or disengageable position allowing movement of said support wheel in the opposite direction or in both directions.

16. A braking device as claimed in claim 8, claim 12 or claim 13, wherein said hand grip means is in the form of a lever part defined by a shaped tubular extension of said body part communicating with said body part bore, said release shaft extending through said hand grip lever part to have an outer end abutting or connected to a depressible button for effecting movement of said shaft to disengage said one plunger from the bore inner end.

17. A braking device as claimed in claim 16, wherein the hand grip lever part is of angled or arcuate form to provide an offset hand grip and said depressible shaft is a flexible or flexible link shaft to be slidably moveable longitudinally within the bore of said angled or arcuate lever parts.

* * * * *

UNITED STATES PATENT AND TRADEMARK OFFICE
CERTIFICATE OF CORRECTION

CERTIFICATE: 5,029,674
ISSUED: July 9, 1991
INVENTOR(S): Barrie J. Boyes et al

It is certified that error appears in the above-identified Certificate and that said Certificate is hereby corrected as shown below:

IN THE ABSTRACT

In line 23 of the abstract delete "(29 I)" and substitute therefor --(29)--.

In column 2, line 68, delete "J-J" and substitute therefor --13-13--.

In column 3, line 9, delete "K-K" and substitute therefor --17-17--.

In column 4, line 47, delete "5-260" and should read --5--.

In column 5, line 52, delete "29" and substitute therefor --22--.

UNITED STATES PATENT AND TRADEMARK OFFICE
CERTIFICATE OF CORRECTION

CERTIFICATE: 5,029,674  Page 2 of 2
ISSUED: July 9, 1991
INVENTOR(S): Barrie J. Boyes et al It is certified that error appears in the above-identified Certificate and that said Certificate is hereby corrected as shown below:

IN THE CLAIMS

Column 10:

In claim 2, line 23, delete "f" and substitute therefor --of said support wheel in any direction, movement of--.

In claim 5, line 2, delete "comprise" and substitute therefor --comprises--; and in line 4, delete "recessed" and substitute therefor --recesses--.

In claim 7, line 1, delete "a" and substitute therefor --as--.

Column 11:

In claim 11, line 15, delete "position" and substitute therefor --positions--.

Column 13:

In claim 15, line 6, delete "sid" and substitute therefor --said--.

Signed and Sealed this

Fifteenth Day of December, 1992

*Attest:*

DOUGLAS B. COMER

*Attesting Officer*  *Acting Commissioner of Patents and Trademarks*